(12) United States Patent
Szymczak et al.

(10) Patent No.: US 6,718,290 B1
(45) Date of Patent: Apr. 6, 2004

(54) SYSTEMS AND METHODS FOR ENCODING TETRAHEDRAL MESHES

(75) Inventors: Andrzej Szymczak, Atlanta, GA (US); Jarek R. Rossignac, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/459,145

(22) Filed: Dec. 10, 1999

Related U.S. Application Data
(60) Provisional application No. 60/111,660, filed on Dec. 10, 1998.

(51) Int. Cl.[7] .................................................. G06F 7/60
(52) U.S. Cl. ........................... 703/2; 345/420; 345/423; 345/440; 382/154
(58) Field of Search .......................... 703/2; 345/423, 345/440, 420; 382/154

(56) References Cited

U.S. PATENT DOCUMENTS

| | | | | |
|---|---|---|---|---|
| 5,553,206 A | * | 9/1996 | Meshkat ...................... 345/423 |
| 5,825,369 A | * | 10/1998 | Rossignac et al. .......... 345/440 |
| 5,886,702 A | * | 3/1999 | Migdal et al. ............... 345/423 |
| 5,905,507 A | * | 5/1999 | Rossignac et al. .......... 345/440 |
| 6,009,435 A | * | 12/1999 | Taubin et al. ................ 707/101 |
| 6,262,737 B1 | * | 7/2001 | Li et al. ....................... 345/419 |
| 6,396,490 B1 | * | 5/2002 | Gorman ....................... 345/419 |

OTHER PUBLICATIONS

Trotts et al., "Simplification of Tetrahedral Meshes", Proceedings of the Conference on Visualization, Oct., 1998, pp. 287–295.*

Staadt et al., "Progressive Tetrahedralizations", Proceedings of the Conference on Visualization, Oct., 1998, pp. 397–402.*

* cited by examiner

*Primary Examiner*—Hugh Jones
*Assistant Examiner*—Herng-der Day
(74) *Attorney, Agent, or Firm*—Thomas, Kayden, Horstemeyer & Risley, LLP

(57) ABSTRACT

Systems and methods for compressing and/or decompressing data corresponding to 3D finite element meshes are provided. Preferably, a method for encoding data corresponding to connectivity information of a 3D finite element mesh, with the mesh being formed of tetrahedra, includes the steps of: providing data corresponding to connectivity information of the 3D finite element mesh, and; reconfiguring the data based upon identification of faces of each of the tetrahedra where other tetrahedra are to be attached.

6 Claims, 8 Drawing Sheets

SYSTEMS AND METHODS FOR ENCODING TETRAHEDRAL MESHES

CROSS REFERENCE TO RELATED APPLICATIONS

This Application is based on and claims priority to U.S. Provisional Application Serial No. 60/111,660, filed Dec. 10, 1998.

BACKGROUND OF THE INVENTION

1. Field of the Invention

The present invention generally relates to the field of computers and, in particular, to systems and methods for compressing and/or decompressing data corresponding to 3D finite element meshes.

2. Description of the Related Art

A simple representation of a tetrahedral mesh whose boundary is a manifold surface typically consists of two tables: a vertex table (which keeps vertex coordinates and vertex data, such as temperature or pressure, for instance) and a tetrahedron table (which stores quadruples of vertex indices, representing vertex sets for each one of the m tetrahedra in the mesh). The tetrahedron table describes explicitly only the vertex incidence for each tetrahedron. However, all other connectivity information, like tetrahedron-face or triangle-vertex incidence can be derived from it algorithmically. For a mesh with one million vertices and six million tetrahedra, the tetrahedron table requires $128m \approx 7.68 \times 10^8$ bits if 4-byte pointers are used to reference vertices or $80m \approx 4.8 \times 10^8$ bits if the vertex references are stored as 20-bit integers crossing the byte boundaries. The total size of the vertex coordinates and data (12-bit coordinates and 16-bit for a single scalar value) of such a mesh amounts to $5.2 \times 10^7$ bits: almost ten times less. Therefore, the connectivity information dominates the storage cost.

Numerous data structures have been proposed that combine adjacency and incidence information complex (see J. Rossignac, Through the cracks of the solid modeling milestone, *From Object Modeling to Advanced Visual Communication*, Eds. S. Coquillard, W. Strasser, P. Stucki, Springer-Verlag, pp. 1–75, 1994) for a review. Examples include winged-edge representation (see B. G, Baumgart, *Winged Edge Polyhedron Representation*, AIM-79, Stanford University, Report STAN-CS-320, 1972, and B. G. Baumgart, *A Polyhedron Representation for Computer Vision*, AFIPS Nat. Conf Proc., Vol. 44, 589–596, 1975), face-adjacency hypergraph (see L. Floriani and B. Falcidieno, *A Hierarchical Boundary Model for Solid Object Representation*, ACM Transactions on Graphics 7(1), pp. 42–60, 1988), half-edge structure (see M. Mantyla, *An Introduction to Solid Modeling*, Computer Science Press, Rockville, Md. 1988, and Y. E. Kalay, The Hybrid Edge: *A Topological Data Structure for Vertically Integrated Geometric Modeling*, Computer-Aided Design 21(3), pp. 130–140, 1989), radial-edge structure (see E. Gursoz and F. Prinz, *Boolean Set Operators on Non-Manifold Boundary Representation Objects*, Computer Aided Design 23(1), pp. 33–39, January/February 1991, and E. Gursoz, Y. Choi and F. Prinz, *Node-Based Representation of Non-Manifold Surface Boundaries in Geometric Modeling*, In: J. Turner, M. Wozny and K. Preiss eds., *Geometric Modeling for Product Engineering*, North-Holland 1989), and selective geometric complex (see J. Rossignac and M. O'Connor, *SGC: A Dimension-independent Model for Pointsets with Internal Structures and Incomplete Boundaries*, in Geometric Modeling for Product Engineering, Eds. M. Wosny, J. Turner, K. Preiss, North-Holland, pp. 145–180, 1989).

The goal behind the design of these data structures is to provide an efficient way of accessing different kinds of adjacency information without taking up much storage space. A common idea is to store some of the adjacency relations (possibly in a partial form) explicitly and use them to derive the ones which are not explicitly stored. For example, in the winged-edge representation, each face and vertex point to one of the adjacent edges and each edge—to its endpoints, the two adjacent faces and the four edges adjacent to that edge and the neighboring two faces. Using the above relations it is possible to compute all others (for example, all edges adjacent to a face or all edges adjacent to a vertex) in time proportional to the local complexity of the mesh (for our two examples, the number of edges of the face and the number of edges our of a vertex, respectively). One of the concerns is to reduce storage space needed to keep adjacency information while minimizing access time. Therefore, it is not fair to treat boundary data structures as a compression scheme. In fact, as shown in T. C. Woo, *A Combination Analysis of Boundary Data Structure*, IEEE Computer Graphics and Applications, Vol. 5, pp. 19–27, 1985, such a data structure requires at least 4E pointers, where E is the number of edges of the mesh—more than tetrahedron table.

Staadt and Gross (see O. Staadt and M. Gross, *Progressive Tetrahedralization*, Proc. IEEE Visualization, pp. 397:402, Research Triangle Park, Oct. 18–23, 1998) and Trotts et al (see I. Trotts, B. Hamann, K. Joy, D. Wiley, *Simplification of Tetrahedral Meshes*, Proc. IEEE Visualization, pp. 287:295, Research Triangle Park, Oct. 18–23, 1998) independently propose a tetrahedral mesh simplification process, which removes tetrahedra by collapsing their edges in a sequence that attempts to minimize, at each stage, the error computed using different cost functions. Such a simplification may be viewed as a lossy compression technique and complements our loss-less compression, which may be used to compactly encode the simplified meshes.

Deering's approach (see M. Deering, Geometric Compression, *Computer Graphics* (Proc. SIGGRAPH), p. 13–20, August 1995) is a compromise between a standard triangle strip and a general scheme for referencing any previously decoded vertex. Deering uses a 16 register cache to store temporarily 16 of the previously decoded vertices for subsequent uses. One could envision extending the notion of a triangle strip to tetrahedra. Keeping 3 registers for the last 3 vertices used, each new tetrahedron will be defined by these 3 vertices and a fourth vertex either new (the next vertex received in the compressed input stream) or previously received (and identified by its location or id in main memory or cache). One of the vertices in the registers will be replaced by the forth one and the operation repeated. Unfortunately, we do not know of simple and efficient algorithms for identifying the suitable sequence of tetrahedra.

Hoppe's Progressive Meshes (see H. Hoppe, *Progressive Meshes*, Computer Graphics (Proc. SIGGRAPH), P. 99–108, August 1996) permit to transfer a 3D mesh progressively, starting from a coarse mesh and then inserting new vertices one by one. Instead of a vertex insertion to split a single triangle, as suggested in D. Dobkin and D. Kirkpatrick, *A linear algorithm for determining the separation of convex polyhedra*, Journal of Algorithms, Vol. 6, pp. 381–392, 1985, for convex polyhedra, Hoppe applies a vertex insertion that is the inverse of the edge collapse operation popular in mesh simplification techniques (see H. Hoppe, T. DeRose, T. Duchamp, J. McDonald and W.

Stuetzle, Mesh Optimization, *Computer Graphics* (Proc. SIGGRAPH), p. 19–26, August 1993, R. Ronfard and J. Rossignac, *Full-range approximation of triangulated polyhedra*, Proc. Eurographics'96, Computer Graphics Forum, pp. C-67, vol. 15, no. 3, August 1996, and P. Heckbert and M. Garland, *survey of Polygonal Surface Simplification Algorithms in Multiresolution Surface Modeling Course*, ACM SIGGRAPH Course Notes, 1997). A vertex insertion identifies a vertex v and two of its incident edges. It cuts the mesh open at these edges and fills the hole with two triangles. The vertex v is thus split into two vertices. Each vertex is transferred only once in the Hoppe's scheme.

Hoppe suggests that it may be possible to extend this scheme to tetrahedra. Each vertex split would require identifying one vertex of the current (simplified) version of the mesh and a cone of incident triangles. As the new vertex is extruded into an edge, these triangles would be extruded into new tetrahedra. The cost of this approach is the identification of each vertex ($\log_2 v$ per vertex) and the identification of the cone of incident edges, which on average would require 15 bits per vertex. Although simple, this approach would require roughly $(3\log_2|V|+45)/20$ bits per tetrahedron.

The Topological Surgery method recently developed by Taubin and Rossignac G. (see Taubin and J. Rossignac, *Geometric Compression Through Topological Surgery*, ACM Transactions on Graphics, Vol. 17, no. 2, pp. 84–115, April 1998) also builds a vertex spanning tree of T that splits the surface of the mesh into a binary tree to corridors (generalized triangle strips). The two trees are encoded using a run length code, which for highly complex meshes yields an average of less than two bits per triangle. In addition, one bit per triangle is used to indicate whether the next triangle in the corridor is attached to the left or to the right edge of the previous one. For pathological cases, with a non-negligible proportion of multi-child nodes in two trees, the above approach no longer guarantees linear storage cost. The application of this technique for VRML files is discussed in G. Taubin, W. Horn, F. Lazarus and J. Rossignac, *Geometry Coding and VRML*, Proceedings of the IEEE, pp. 1228–1243, vol. 96, No. 6, June 1998.

Inspired by D. Kirkpatrick, *Optimal Search in Planar Subdivision*, SIAM Journal of Computing, vol. 12, pp. 28–35, 1983, and improving on M. Naor, *Succinct Representation of General Unlabeled Graphs, Discrete Applied Mathematics*, vol. 29, pp. 303–307, North Holland, 1990, and J. Snoeyink and M. van Kerveld, *Good Orders for Incremental (Re)construction*, Proc. ACM Symposium on Computational Geometry, pp. 400–402, Nice, France, June 1997, Denny and Sohler proposed a technique for compressing planar triangulation of sufficiently large size as a permutation of its vertices (see M. Denny and C. Sohler, *Encoding a triangulation as a permutation of its point set*, Proc. 9$^{th}$ Canadian Conference on Computational Geometry, pp. 39–43, Ontario, Aug. 11–14, 1997). They show that there are less than $2^{8.2|V|+O(\log_2|V|)}$ valid triangulation may be associated with a different permutation of these vertices. Their approach requires transmitting an auxiliary triangle that contains all the vertices and the vertices themselves in a suitable order computed by the compression algorithm. Although for sufficiently complex models, the cost of storing the mesh incidents is null, the unstructured order in which the vertices are received in the absence of the incidence graph during their decompression makes it difficult to use predictive techniques for vertex data encoding.

Edgebreaker, introduced by Rossignac (see J. Rossignac, Edgebreaker: *Compressing the Connectivity of Triangle Meshes*, GVU Technical Report GIT-GVU-98-17, Georgia Institute of Technology), allows to compress the connectivity of a triangular mesh using only about 2 bits per triangle. The compression starts with a depth-search traversal of the dual graph of the mesh. The traversal is topological, i.e., after a triangle is discovered, we first visit the triangle adjacent along its right edge whenever it is possible. Whenever a new triangle is discovered, it is classified as one of five possible types according to which of its edges are shared with triangles which remain undiscovered. A variable length encoding technique is then applied to encode the sequence of types of triangles encountered during the traversal using about 2 bits per triangle. That sequence of triangle types turns out to be sufficient to reconstruct the original mesh. In principle, the Edgebreaker could be extended to the 3D case. However, it is not that simple. For example, sometimes extra information would be needed to encode the offset of the fourth vertex when a new tetrahedron without any new vertices is added to the mesh during decompression. Also, the number of ways in which a removal of a tetrahedron can split the mesh into connected components is considerably larger than in the 2D case. (Other compression schemes for planar graphs and triangulations are discussed in K. Keeler and J. Westbrook, *Short Encodings of Planar Graphs and Maps, Discrete Applied Mathematics*, No. 58, pp. 239–252, 1995, and G. Turan, *On the Succinct Representation of Graphs, Discrete Applied Mathematics* 8, pp. 289–294, 1984, among others.)

Therefore, there is a need for improved systems and methods which address these and other shortcomings of the prior art.

SUMMARY OF THE INVENTION

Briefly stated, the present invention relates to systems and methods for compressing and/or decompressing data corresponding to 3D finite element meshes. In a preferred embodiment of the present invention, a method for encoding data corresponding to connectivity information of a 3D finite element mesh is provided, with the mesh being formed of tetrahedra. The method includes the steps of: providing data corresponding to connectivity information of the 3D finite element mesh, and; reconfiguring the data based upon identification of faces of each of the tetrahedra where other tetrahedra are to be attached.

In accordance with another aspect of the present invention, a preferred method includes the steps of: receiving data corresponding to connectivity information of the 3D finite element mesh, with the connectivity information including an order of vertices of the tetrahedra; selecting a first face of a first tetrahedron of the 3D finite element mesh; systematically traversing the tetrahedra beginning with the first tetrahedron, and, encoding connectivity information of the 3D finite element mesh based upon a re-ordering of the vertices to define an encoded mesh.

In accordance with yet another aspect of the present invention, a computer readable medium having a computer program stored thereon and being executable by a computer to perform method steps for encoding data corresponding to connectivity information of a 3D finite element mesh is provided. In a preferred embodiment, the method steps include receiving data corresponding to connectivity information of the 3D finite element mesh, and reconfiguring the data based upon identification of faces of each of the tetrahedra where other tetrahedra are to be attached.

In accordance with still another aspect of the present invention, a computer readable medium having a computer program stored thereon and being executable by a computer to perform method steps for reconfiguring encoded data corresponding to connectivity information of a 3D finite element mesh is provided, with the connectivity information defining an ordering of vertices corresponding to a traversal order of the tetrahedra performed during an encoding process. In a preferred embodiment, the method steps include receiving the encoded data corresponding to the connectivity information of the 3D finite element mesh, and a reconstructing the 3D finite element mesh based upon the encoded data.

Other features and advantages of the present invention will become apparent to one of reasonable skill in the art upon examination of the following drawings and detailed description. It is intended that all such additional objects, features, and advantages be included herein within the scope of the present invention, as defined by the claims.

BRIEF DESCRIPTION OF THE SEVERAL VIEWS OF THE DRAWINGS

The present invention will be more fully understood from the accompanying drawings of various embodiments of the invention which, however, should not be taken to limit the invention to the specific embodiments enumerated, but are for explanation and for better understanding only. Furthermore, the drawings are not necessarily to scale, emphasis instead being placed upon clearly illustrating the principles of the invention. In the drawings.

DETAILED DESCRIPTION OF A PREFERRED EMBODIMENT

Reference will now be made in detail to the description of the invention as illustrated in the drawings, wherein like reference numbers indicate like parts throughout the several views. As presented herein, a preferred embodiment of the tetrahedral mesh encoding system of the present invention generally may be described as comprising two components: 1) information defining a complex containing information corresponding to tetrahedra appearing in the encoded mesh and some of the incidence relationships, and; 2) instructions regarding how to uncover incidence relationships absent from the complex, preferably through the use of folding and gluing operations, as described in detail hereinafter.

Figure 1:
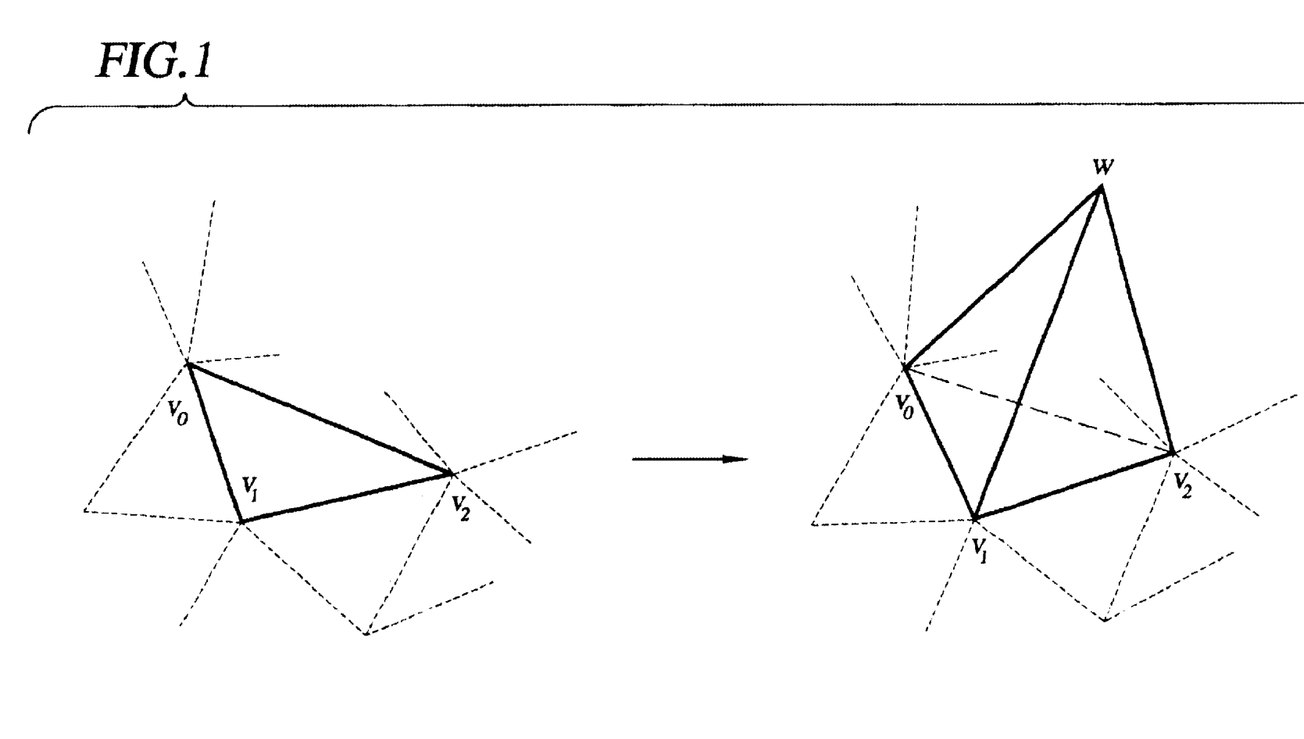
FIG. 1 is a schematic diagram depicting a representative attaching operation.

As an introductory matter, a tetrahedron tree is a three-dimensional simplicial complex which can be obtained from a single tetrahedron as a result of gluing, i.e., incrementally applying the operation of attaching a tetrahedron to an external face. As shown in FIG. 1, attaching a tetrahedron to an external face with vertices $v_0$, $v_1$, $v_2$ is equivalent to creating a new vertex w and adding a tetrahedron with vertices $v_0$, $v_1$, $v_2$ and w to the mesh. In the preferred embodiment of the present invention described herein, a tetrahedron tree string preferably is utilized to store information about which external faces are attachable, i.e., to which of them tetrahedra are attached later. As described in detail hereinafter, after each attaching application, the decompression procedure utilized by the present invention preferably reads a triple of bits of the encoding string and marks each of the three new external faces ($v_0v_1w$, $v_1v_2w$ and $v_0v_2w$ on FIG. 1) as either attachable or not, according to the value of the corresponding bit of the triple. Therefore, a preferred embodiment of the tetrahedron tree string utilizes one triple of bits per tetrahedron, which yields a total of 3m bits where m is the number of tetrahedra in the mesh.

Using the tetrahedron spanning tree string, the decoding algorithm of the present invention is able to grow a tetrahedron tree with a tetrahedron table T', having m rows and m+3 vertices, where m is the number of tetrahedra in the original mesh M. The tetrahedron tree can be thought of as the result of cutting M along the surface formed by cut triangles, defined hereinafter. Therefore, tetrahedra of the tree correspond to tetrahedra of M, preferably in a one-to-one fashion and each external triangle of the tree either corresponds to an external triangle of M or belongs to a pair of triangles corresponding to a single cut triangle of M.

Figure 2:
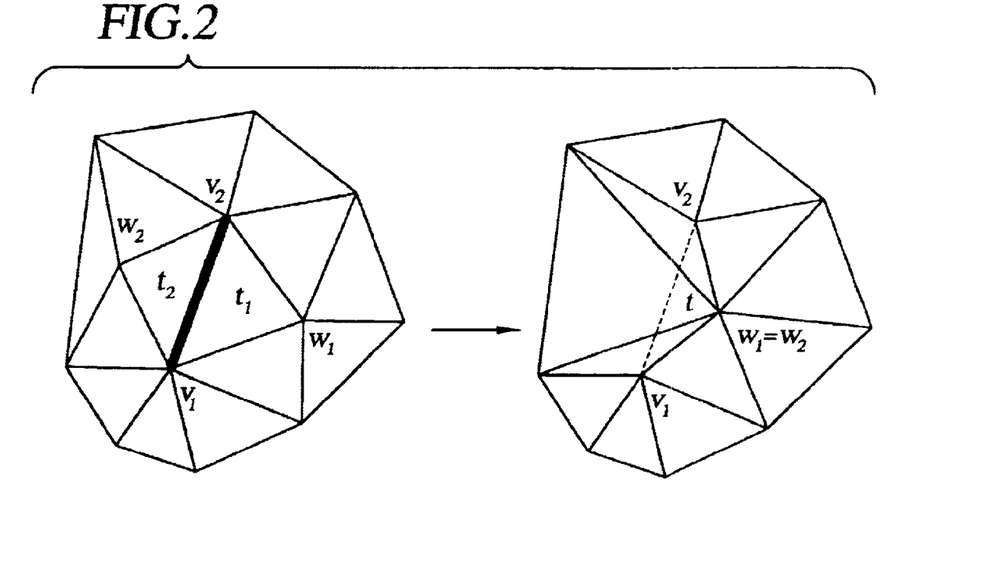
FIG. 2 is a schematic diagram depicting a representative folding operation.

In order to reconstruct the mesh M from the tree, identification of the triangles belonging to the same pair is accomplished. Preferably, this is accomplished by incrementally applying gluing and folding operations. A folding operation (FIG. 2) "folds" the boundary of a mesh at an edge, i.e., edge $v_1v_2$. It can be executed only if that edge is the fold edge in both external triangles adjacent upon it. As a result, the two incident triangles, i.e., $t_1$ and $t_2$, are identified and become an internal face of the mesh, and their two vertices (i.e., $w_1$ and $w_2$, the ones that bound the two incident triangles but not their common edge) are equated. The folding operation changes the adjacency of nearby faces, so it may make two triangles of the starting mesh which do not share an edge be adjacent along a fold edge. Such triangles are identified by a fold operation, preferably performed later during decompression. Thus, the way in which fold edges are defined to external triangles (later referred to as the folding scheme) imposes restrictions on the order of execution of folding operations, e.g., it determines the way in which the vertices are equated uniquely. However, there may be several sequences of folding operations consistent with it, and, hence, leading to that particular way of equating vertices.

Figure 3:
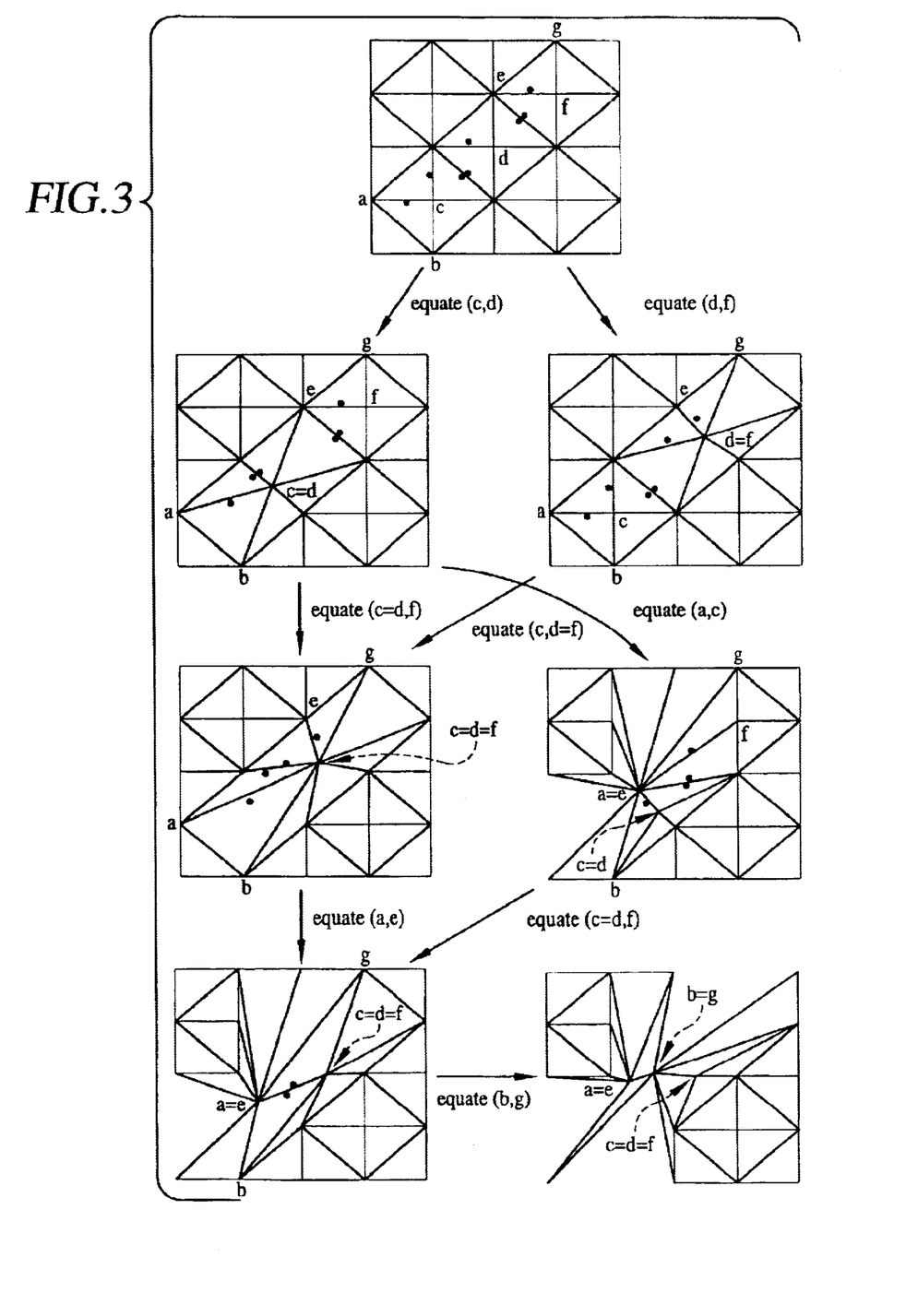
FIG. 3 is a sequence of schematic diagrams depicting different ways of executing folding operations.

As shown in FIG. 3, different ways of executing folding operations for a mesh, whose boundary is shown in the uppermost mesh depicted in FIG. 3, lead to equating vertices in the same way, i.e., in the manner depicted in the folded mesh depicted at the bottom right of FIG. 3. As depicted therein, dots oriented among the surfaces of the mesh indicate the fold edge of a triangle, and arrows indicate folding operations consistent with the folding scheme.

The need for gluing operation, which identifies two arbitrary external triangles, arises when two external triangles do correspond to the same triangle of the mesh M, but never become adjacent along the fold edge in both. Being more general than the folding operation, gluing operation alone suffices to construct M from the tree. However, the advantage of the folding operation is that it is cheaper to encode.

The preferred embodiment of the present invention preferably utilizes a folding string which associates two bits of information with each external triangle of the tetrahedron tree given by the tetrahedron table T except for the one corresponding to the entry face. This 2-bit fold code distinguishes faces on which the folding operation is to be executed (fold faces) from other faces and, for each fold face, identifies one of its edges as the fold edge. Gluing operations preferably are encoded as two integers identifying the two external triangles to be glued and a 2-bit glue code which specifies the "twist" which has to be applied to one of them before the identification.

Figure 4:
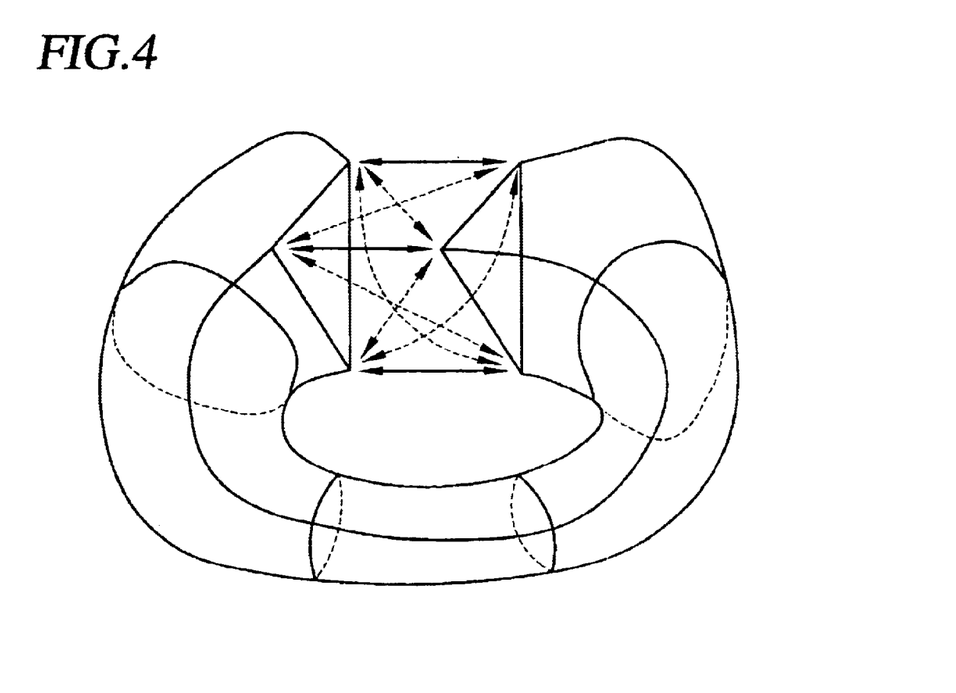
FIG. 4 is a schematic diagram depicting representative ways of equating vertices of two triangles during a gluing operation.

As shown in FIG. 4, there are three possible ways of equating vertices of two glue triangles (shown by arrows of different styles). For each of the glue triangle pairs, one of them is specified by the glue code. Thus, gluing operations are considerably more expensive to encode. Fortunately, their number in a typical mesh is relatively small compared to the number of folding operations (test cases indicate that it is 200 to 700 times smaller), so that they usually do not contribute to more than 1 to 2% of the encoding size.

The total size of the encoding of the preferred embodiment of the present invention discussed herein is $7m+2+([\log_2(g+e-1)]+1)g$, where m, g, and e are the number tetrahedra, glue faces of the tetrahedron tree and external faces of the original mesh, respectively. This cost can be broken as follows: the encoding of the tetrahedron spanning tree takes 3m bits. Storing the fold codes requires two bits per external face of the tetrahedron tree except for the one corresponding to the entry face. Since a tetrahedron has four external faces and attaching a tetrahedron to an external face increases the number of external faces by two, the total number of external triangles in any tetrahedron tree with m tetrahedra is $2m+2$. It follows that we need $2(2m+1)=4m+2$ bits to store the fold codes. Fold triangles get non-zero fold codes, while all others (either glue, i.e., identified by means of gluing or corresponding to external faces of the original mesh) preferably get the code of 00. Thus, we can specify a glue face using $[\log_2(g+e-1)]$ bits, where by e and g we denote the number of external faces of the original mesh and glue faces of the tetrahedron tree, respectively. Including the 2-bit code specifying the twist, each glue triangle pair requires $2[\log_2(g+e-1)]+2$ bits to encode. The total size of the encoding of all glue triangle pairs is, therefore, $([\log_2(g+e-1)]+1)g$ bits.

It should be noted that the system of the present invention can be implemented in hardware, software, firmware, or a combination thereof In the preferred embodiment described herein, however, the present invention is implemented as a software package, which can be adapted to run on different platforms and operating systems as shall be described further herein. In particular, a preferred embodiment of the system, which comprises an ordered listing of executable instructions for implementing logical functions, can be embodied in any computer readable medium for use by or in connection with an instruction execution system, apparatus, or device, such as a computer-based system, processor containing system, or other system that can fetch the instructions from the instruction execution system, apparatus or device, and execute the instructions. In the context of this document, a "computer readable medium" can be any means that can contain, store, communicate, propagate or transport the program for use by or in connection with the instruction execution system apparatus or device. The computer readable medium can be, for example, but not limited to, an electronic, magnetic, optical, electromagnetic, infrared, or semi-conductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 5:
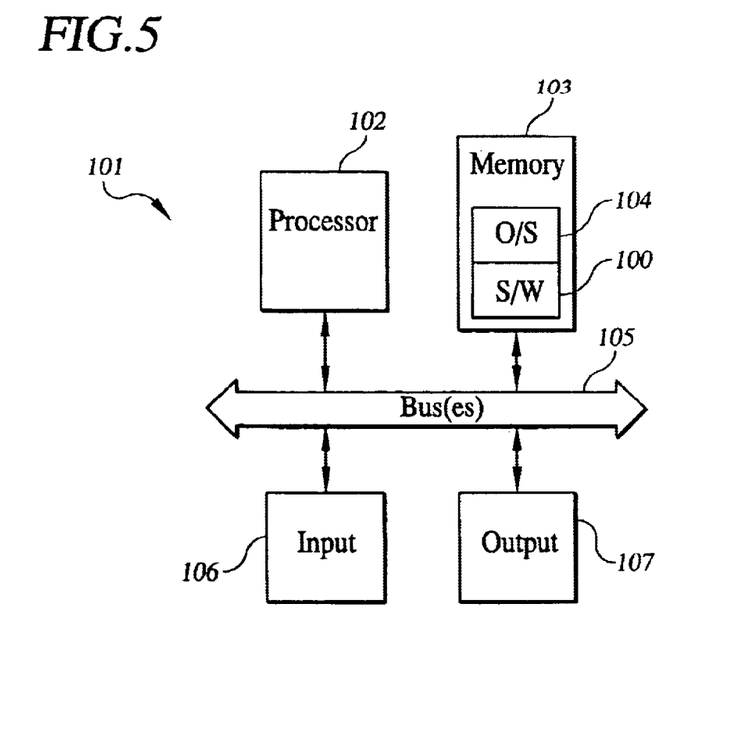
FIG. 5 is a high-level schematic diagram of a representative processor-based system.

FIG. 5 illustrates a typical computer or processor-based system 101 which may utilize the encoding system of the invention. As shown in FIG. 5, computer system 101 generally comprises a processor 102 and a memory 103 with an operating system 104. Herein, the memory 103 may be any combination of volatile and nonvolatile memory elements, such as random access memory or read only memory. The processor 102 accepts instructions and data from memory 103 over a local interface 105, such as a bus(es). The system also includes an input device(s) 106 and an output device(s) 107. Examples of input devices may include, but are not limited to a serial port, a scanner, or a local access network connection. Examples of output devices may include, but are not limited to, a video display, a Universal Serial Bus, or a printer port. Generally, this system may run any of a number of different platforms and operating systems, including, but not limited to, Windows NT™, Unix™, or Sun Solaris™ operating systems. The encoding system 100 of the present invention, the functions of which shall be described hereinafter, resides in memory 103 and is executed by the processor 102.

Figure 6:
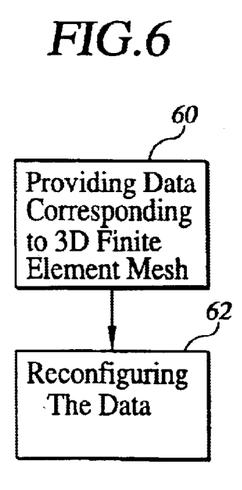
FIG. 6 is a flow diagram depicting the functionality of a preferred embodiment of the present invention.

Referring now to FIG. 6, the functionality and operation of a preferred implementation of the encoding system will now be described. In this regard, each block of the flow chart represents a module segment or portion of code which comprises one or more executable instructions for implementing the specified logical function or functions. As shown in FIG. 6, the process preferably begins at block 60 where data corresponding to connectivity information of a 3D finite element mesh is provided to the system. Various methods of inputting the mesh data may be used, such as, for example, importing the parameters from a separate software package, examples of which include NETGEN (See, J. Schöberl. NETGEN—an advancing front 2D/3D-mesh generator based on abstract rules. After receiving the data, the system preferably proceeds to block 62, where the data is reconfigured based upon identification of faces of each of the tetrahedra where other tetrahedra are to be attached. As described in detail hereinafter, reconfiguration of the data may include compressing and/or decompressing the data, with such operations being performed at one or multiple sites.

Figure 7:
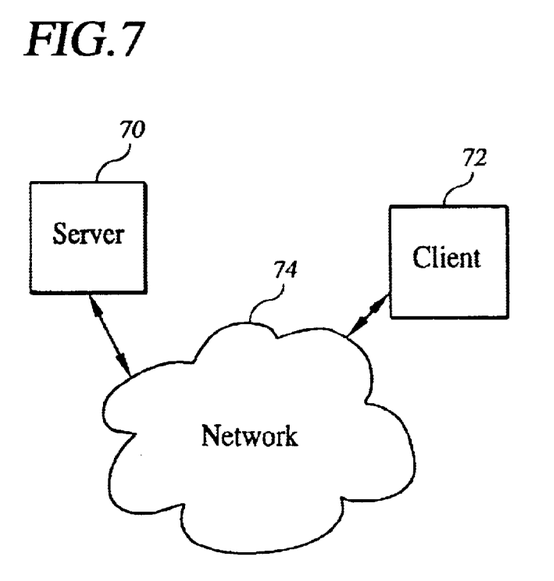
FIG. 7 is a high-level schematic diagram depicting a preferred embodiment of the present invention.

For example, as depicted in FIG. 7, the server system 70 implementing the present invention (such as a processor-based system depicted in FIG. 5, for instance) may be configured to communicate with other systems, such as client system 72, through the use of a communications network 74, i.e., internet, intranet or buses. So configured, utilization of the present invention may allow for data compression of a tetrahedral mesh to occur at the server, with compressed mesh data resulting from utilization of the present invention being transmittable to the client via the network. Once received by the client, the compressed mesh data may then be decompressed at the client site through use of the decompression algorithm of the present invention. Preferred embodiments of both the compression and decompression algorithms will now be described in detail.

Figure 8:
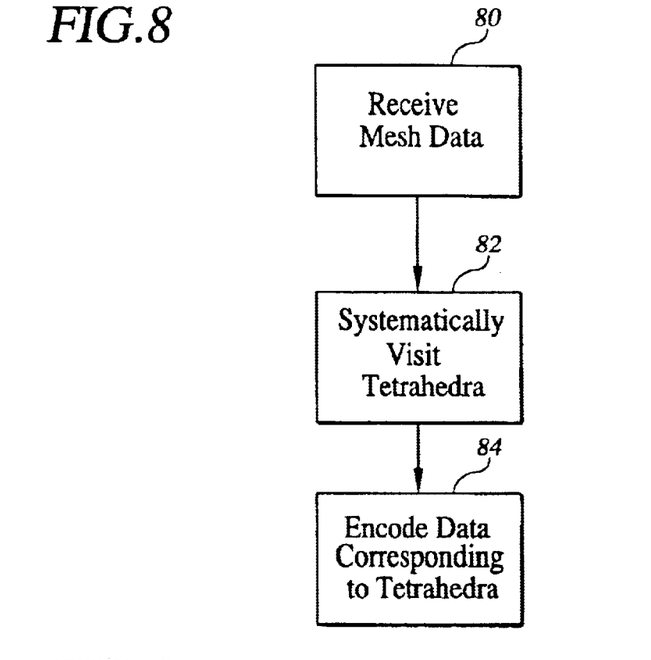
FIG. 8 is a flow diagram depicting the functionality of a preferred compression algorithm of a preferred embodiment of the present invention.

As shown in FIG. 8, a preferred embodiment of the present invention incorporates the use of a compression algorithm or subroutine which preferably begins by receiving mesh data, such as depicted in block 80. It should also be noted that in some alternative. implementations the functions noted in the various blocks may occur out of the order depicted in FIG. 8. For example, two blocks shown in succession in FIG. 8 may in fact be executed substantially concurrently depending upon the functionality involved. The subroutine preferably then proceeds to block 82 where the tetrahedra forming the mesh are systematically visited. Then, as depicted in block 84, the subroutine encodes data corresponding to the tetrahedra with the encoded data being in a compressed format as compared to the mesh data originally received by the system. For ease of description, the encoding step carried out in block 84 will be described hereinafter in regard to three major steps: 1) building and encoding a tetrahedron spanning tree; 2) creating a folding scheme, and; 3) building the folding string.

In order to build a tetrahedron spanning tree, one chooses an external triangle of the mesh to be the entry face and uses the incident tetrahedron as the root. Starting from the root, we traverse each tetrahedron once using a recursive procedure which systematically selects the next candidate from the undiscovered neighbors of the current tetrahedron. For a tetrahedron which is not the root, by its door, we mean the triangle which separates it from its parent. This recursive procedure preferably corresponds to a depth-first search traversal of the dual graph of the mesh, in which nodes correspond to tetrahedra and links to triangles that separate two tetrahedra, although various other traversal schemes may be utilized, and are considered well within the scope of the present invention.

Figure 9A:
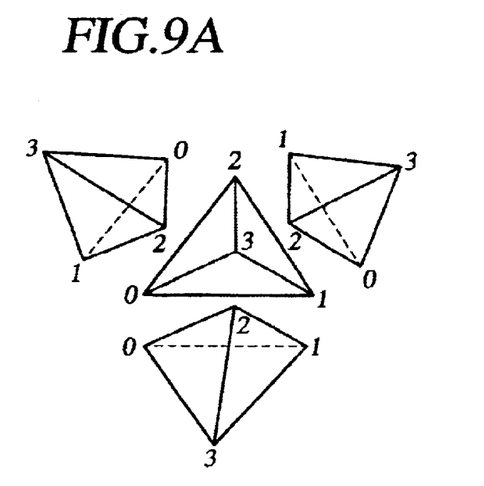
FIG. 9A is a schematic diagram depicting induced orderings of vertices of branching tetrahedra.
Figure 9B:
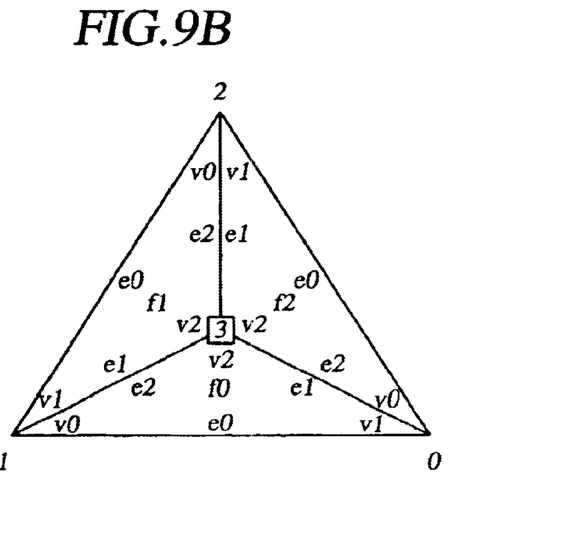
FIG. 9B is a schematic diagram depicting enumeration orders of the three non-door faces and edges, and vertices of each of the faces.

Given a tetrahedron spanning tree, there are various types of triangle faces in the mesh: 1) external faces (those on the boundary of the mesh); 2) doors (triangles corresponding to tree edges of the dual graph of the mesh; equivalently, those which are door faces to some tetrahedron); and 3) cut faces (all other, i.e., internal faces which are not doors). The encoding of the tretrahedron tree preferably includes the use of a sequence of triplets of bits, one per tetrahedron, arranged in the traversal order. The i-th bit in a triple encodes whether the i-th face of the corresponding tetrahedron is a door to some other tetrahedron. To make this precise, we need an enumeration order of faces of each of the tetrahedra. In the preferred embodiment described herein, this order is defined by the ordering of vertices of the tetrahedron, assigned to it as it is discovered in the traversal in the way shown in FIGS. 9A and 9B, for instance. The door to the tetrahedron shown in FIGS. 9A and 9B is the back face. Note that the particular ordering described in relation to FIGS. 9A and 9B is somewhat arbitrary and can easily be substituted with a different ordering convention.

We also use the traversal order of tetrahedra to obtain the order in which the vertices have to be rearranged before being made a part of the encoding string. Consider this sequence s of vertices obtained by concatenating sequences of vertices of all tetrahedra in the traversal order (for each single tetrahedron, we preferably list its vertices in the order assigned during the traversal). Clearly, the length of s is 4m and each vertex of the mesh appears as its entry. However, most vertices appear in it more than once (except for those which are vertices of precisely one tetrahedron). To get rid of the repeating vertices, we preferably scan the sequence s leaving only the entries encountered for the first time and removing all others. The resulting permutation of vertices defines the order in which the vertex data has to be transmitted to ensure correct reconstruction for the mesh geometry by the decompression algorithm.

Figure 10:
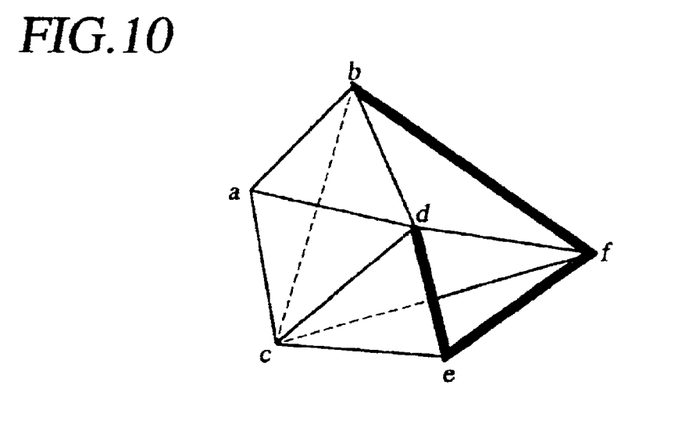
FIG. 10 is a schematic diagram depicting representative free edges of a tetrahedral mesh.
Figure 11A:
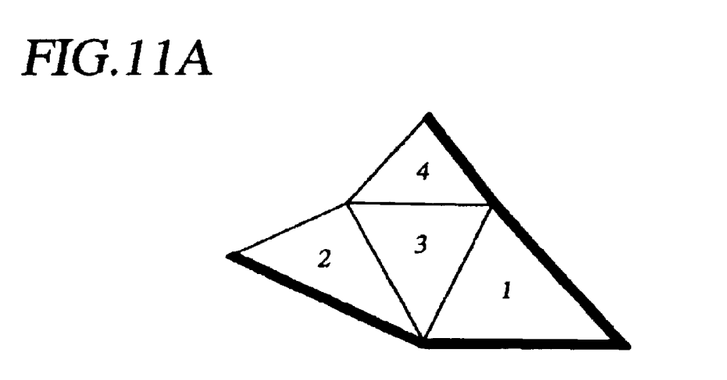
FIG. 11A is a schematic diagram depicting g-triangles.
Figure 11B:
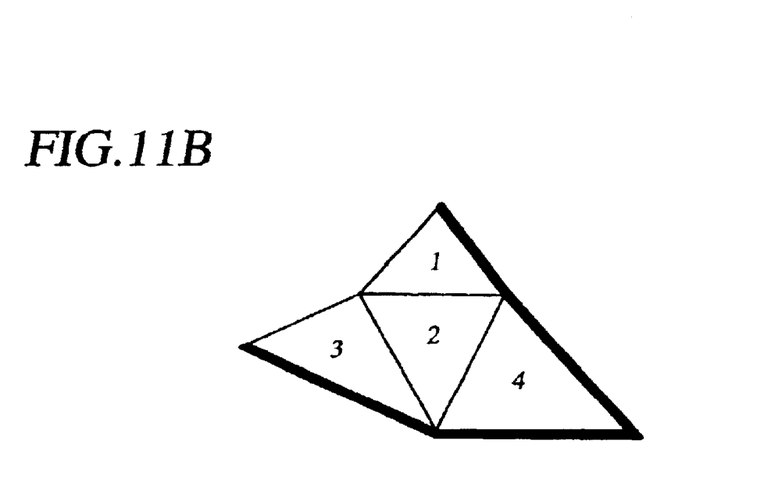
FIG. 11B is a schematic diagram depicting g-triangles based upon a removal order different from that depicted in FIG. 11A.

In regard to creating a folding scheme, recall that the folding scheme imposes restrictions on the order of execution of folding operations so that the decompression procedure restores the structure of the original mesh from the tetrahedron tree. The process of building a folding scheme is essentially an inversion of the gluing and folding operations performed during decompression. This can be seen very clearly when one thinks of it in terms of the complex C resulting from the original mesh by cutting it along the cut surface formed by the cut triangles. To construct a folding scheme, we preferably delete the cut triangles one at a time. Such a removal of a cut triangle is equivalent to identifying the two external triangles of C which correspond to that triangle. If the identified triangles share an edge, the identification is a folding operation. This preferably happens if and only if the removed triangle has a free edge, i.e., an edge which is an internal edge of the original mesh and, at the same time, is not shared with any other cut triangle (such a configuration is depicted in FIG. 10, where bold lines indicate free edges of the surface consisting of triangles abc, abd, acd, bcd, cde, cdf, cef, and bdf). If this is the case, we mark t as an f-triangle (f for fold) and one of its free edges as its f-edge. Otherwise, t is classified as a g-triangle (g for glue). Clearly, the number of the f- and g-triangles depend on the order in which they are removed. For instance, as shown in FIG. 11, the numbers of g-triangles for the two removal orders are (a) 2, and (b) 0, with the thick edges being external edges of the mesh. Use of the preferred embodiment of the present invention leads to the removal order shown in (b), possibly with the third and fourth triangles being switched.

Since glue triangles cost more, we would like to make the number of g-triangles as small as possible. In order to do that, we preferably do not remove cut triangles with no free edges unless there is no other choice. For the surface depicted in FIG. 10, an example of triangle removal order which may be produced by the above procedure is: bdf (bf becomes its f-edge), cdf (f-edge; df), ced (de), cef (any edge can be taken as its f-edge), abc (this is a g-triangle), abd (f-edge: ab), acd (ac or ad), bcd (any edge can be the f-edge).

In regard to building the folding string, preferred embodiments of the present invention preferably assign 2-bit fold codes to all pairs (T, t) with T being a tetrahedron and t being in any cut or external triangle (excluding the entry face) adjacent to it. In what follows, such pairs are referred to as cut pairs. If t is either an external face or a g-triangle, a code, such as 00, may be utilized. If t is an f-triangle, the code depends on which of its edges is the f-edge. Preferably, the code of 01, 10 or 11 is assigned to the cut pair (T, t) according to whether the f-edge of t is its first, second, or third edge (in the ordering of edges relative to T).

Apart from the fold code, two extra bits of information may be associated with a g-triangle t (i.e., the glue code). Since it is an internal triangle, there are exactly two tetrahedra $T_1$ and $T_2$ adjacent to it. Assuming that $T_1$ comes before $T_2$ in the traversal order, the 2-bit glue code simply encodes whether the first vertex of t in the order relative to $T_1$ matches its first, second, or third vertex in the order relative to $T_2$.

The traversal order together with the orderings of vertices of tetrahedra induce an ordering of cut pairs in the following way. If a tetrahedron T is traversed before T', then any cut pair whose tetrahedron is T precedes any cut pair whose tetrahedron is T'. For cut pairs with the same tetrahedra, i.e., of the form (T, t) and (T, t'), we use the ordering of non-door faces of T to break the tie: (T, t) comes before (T, t') if and only if t precedes t' in the ordering of non-door faces.

To obtain the folding string, we concatenate the fold codes of all cut pairs in the above order (obtaining a string of 4m+2 bits) and the encoding of all g-triangles. The encoding of a g-triangle t preferably includes:

1) the encoding of the two cut pairs having t as their triangle. This requires 2[$\log_2$(g+e−1)] bits, where e is the number of external faces of the original mesh and g is twice the number of g-triangles (equivalently, the number of glue triangles of the tetrahedron spanning tree reconstructed during decompression). This is because we encode each cut pair as an integer, being the number of cut pairs with the fold code of 00 preceding it in our order, and there are g+e−1 such cut pairs; and
2) the 2-bit glue code.

Thus, the resulting folding string takes 2(2m+1)+([$\log_2$(g+e−1)]+1)g bit.

Figure 12:
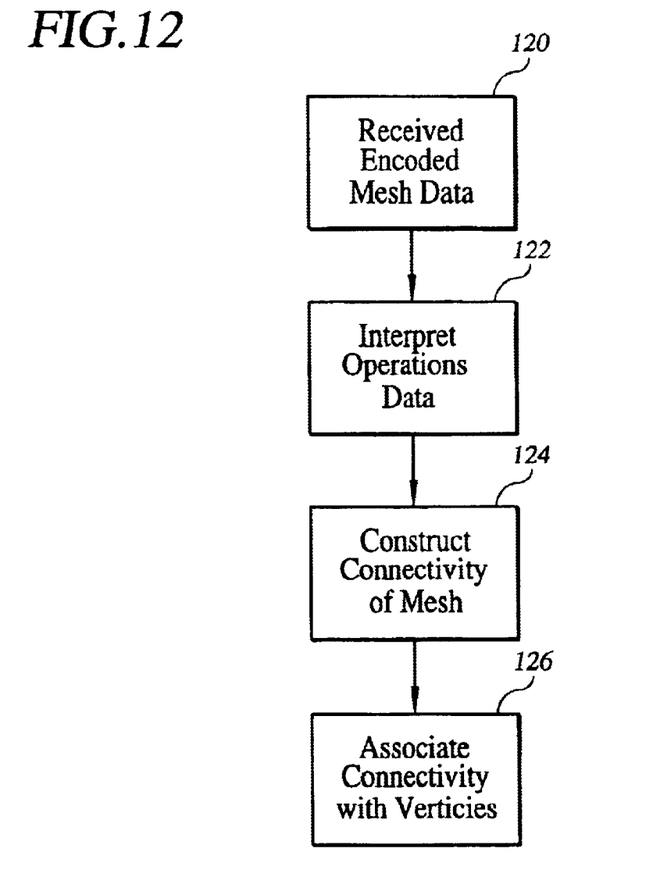
FIG. 12 is a flow diagram depicting the functionality of a preferred decompression algorithm of a preferred embodiment of the present invention.

Referring now to FIG. 12, a preferred embodiment of the present invention incorporates a decompression algorithm or subroutine. As depicted therein, the decompression subroutine preferably begins at block 120 where encoded mesh data is received. Proceeding to block 122, the subroutine preferably interprets operations data from the encoded mesh data and then proceeds to block 124 where connectivity of the mesh is constructed. The connectivity preferably is then associated with respective vertices in block 126 so that the original mesh may be reconstructed. For purposes of this discussion, the decompression subroutine may be further described in relation to the following steps: 1) growing a tetrahedron tree based on the tetrahedron tree encoding; 2) reading and interpreting the folding string by classifying the external triangles as glue, fold or boundary, assigning fold edges to fold triangles, pairing up glue triangles, and assigning a glue code to each pair; 3) initializing data structures representing the boundary of the mesh and keeping track of how vertices are equated; 4) gluing, including applying the correct twist determined by the glue code; 5) folding; and 6) mapping the m+3 vertex labels in the tetrahedron tree table into n vertex labels corresponding to vertices of the decoded mesh.

Regarding growing a tetrahedron tree, the purpose of this part of the decompression algorithm is to build such a tetrahedron tree based on information provided by the tetrahedron tree string and to define the ordering of vertices and tetrahedron consistent with the orderings introduced during compression. The tree growing procedure preferably starts with a single tetrahedron and builds a tetrahedron tree by incrementally applying the attaching operation to it.

A representative pseudocode which performs the tree growing procedure is set forth as follows:

```
procedure grow_tree (s: bit sequence)
   :tetrahedron_table
var
   t: tetrahedron table;
   next_unused_reference,current_bit, i: integer;
   v0,v1,v2,v3: integer; # vertex references
begin
   empty the stack and the table t;
   push(0,1,2);
   next_unused_reference:=3;
   current_bit:=0;
   while current_bit<length(s) do:
      (v0,v1,v2):=pop( );
      v3:=next_unused_reference ++;
      put (v0,v1,v2,v3) at the end of the table t;
         push(v2,v0,v3);
      if s[current bit+1]=1 then
         push(v1,v2,v3);
         push(v0,v1,v3);
   end;
```

In the preferred implementation described herein, the vertices are represented by integers which can be thought of as vertex labels, which are increasing integers for consecutive vertices as they are first encountered in their construction. A stack is used to keep triples of vertices defining detachable external triangles of the mesh. Initially, the meshes empty and the stack contains a triple of vertices (represented by the integer 0, 1, 2) bounding the triangle corresponding to the entry face of the original mesh. The growing procedure pops a list of vertices from the stack and attaches a tetrahedron to the face bounded by those vertices. This is done by creating a new vertex (represented by the least non-negative integer which has not been used to reference a vertex) and inserting it, together with the three popped vertices, into the tetrahedron table. Then, a triple of bits is read from the encoding string and, for each nonzero bit of that triple, a face of a newly added tetrahedron is pushed on the stack. The way in which the bits of the triple are associated with faces of tetrahedra as well as the order in which the vertices of the pushed triple are listed mimic the orderings used during compression. The output of the growing procedure is a tetrahedron table describing a tetrahedron tree together with an ordering of tetrahedron (given by the order in which they appear in the tetrahedron table) and ordering of vertices for each tetrahedron (the order in which they appear in a corresponding row of the table). Note that the decoding procedure is able to detect where the tetrahedron tree string ends without the need of any separator between it and the folding string.

Figure 13A:
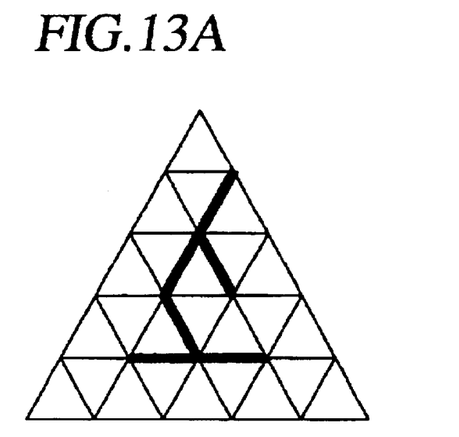
FIG. 13A is a schematic diagram depicting a representative two-dimensional mesh.
Figure 13B:
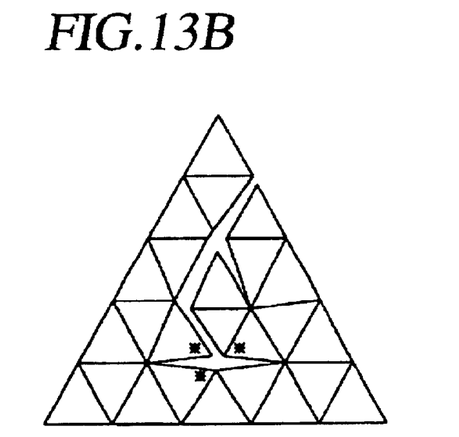
FIG. 13B is a schematic diagram of the representative two-dimensional mesh of FIG. 13A shown cut along the edges depicted in bold.

Although the tetrahedron tree grown based on the tetrahedron tree string preferably contains all tetrahedra and some of the adjacency relationships of the original mesh, they do not have the same structure unless the mesh is a tetrahedron tree itself Geometrically speaking, the tetrahedron tree can be thought of as a result of cutting the original mesh along the surface formed by the cut triangles. A two-dimensional examples of the cutting is shown in FIGS. 13A and 13B. Cutting may replicate vertices (in FIG. 13B, the three vertices of the cut marked with "*" are replicas of the same vertex of the original mesh depicted in FIG. 13A). The purpose of folding and gluing is to equate these replicated vertices to a single vertex.

The folding string is used to categorize the external triangles of the tetrahedron tree as fold, glue and boundary, corresponding to f-triangles, g-triangles and external triangles of the original mesh. To each fold triangle, one of its edges is assigned as the fold edge. The glue triangles are paired up and aligned preferably using the 2-bit glue code. This preferably is done by visiting the external faces of the tetrahedron tree in the same order as during compression and using the fold codes in the folding string to identify the face type and the fold edge for fold faces. Faces whose fold code are 01, 10 or 11 become fold faces and have the first, second and third edge assigned as the fold edge. Faces with the fold code of 00 become either boundary of glue.

Let l be the number of such faces. In order to distinguish boundary triangles from glue triangles, we read the g-triangle encodings, which start with the (4m+3)-th bit of the folding string and occupy $2[\log_2 l]+2$ bits each. Their interpretation is as follows. The first and second $[\log_2 l]$ bits encode 2 triangles with the fold code of 00, each one of them as an integer being the number of triangles preceding it with that fold code. These two triangles become a pair of glue triangles and they obtain the last two bits of the g-triangle encoding as their associated glue code.

In regard to initializing the data structure representing the boundary of the original mesh, the basic building blocks of the representation of the boundary of the mesh are:

1) the triangle record, keeping three vertex references (integers, the same as those in the tetrahedron table), three pointers to adjacent edges and a set of flags allowing to determine if the triangle is a fold triangle and, if so, which of its edges is the fold edge, and;
2) the edge record, keeping two pointers to adjacent triangles.

The construction of the above-mentioned data structure can be implemented as a part of the tree growing procedure: it is initialized so that it describes the boundary of a single tetrahedron on start up and then it is updated, preferably, right after each attaching operation.

Both gluing and folding identify two external triangles of the mesh and, therefore, change the structure of its boundary. Thus, the data structure storing the boundary of the mesh should be updated after each glue or fold operation. For a fold operation, an update may be produced by an edge swap followed by an edge collapse.

In regard to the mapping of vertices, while updating the boundary of the mesh, we preferably equate the corresponding vertices of the identified triangles. Equating vertices with labels i and j is equivalent to replacing each occurrence of j in the tetrahedron table by i and subtracting 1 from all labels greater than j. In the preferred embodiment described herein, label changes are performed as a post-processing step. More precisely, when we glue and fold, we maintain a graph whose vertices are labels 0, 1, ... m+2 and edges join the equated pairs of labels. After all gluing and folding operations are performed, we preferably compute the mapping of the original labels into target ones by computing and ordering the connected components of the outcoming graph.

In regard to gluing and folding operations, we preferably start by performing the gluing operations. In particular, we go over all glue triangle pairs and identify the two triangles in each pair and their corresponding vertices, updating our representation of the boundary of the mesh. The glue code of each pair provides information about what twist to apply before identifying the two triangles. A representative pseudocode of the gluing operations is as follows:

procedure glue;
begin
   for all glue pairs do:
      Let t and u be pointers to the two triangles in the pair, ^t precedes ^u in the tetrahedron table
      and v0,v1,v2 and w0,w1,w2 the vertex references of these triangles (in order);
      # twist according to the glue code
      if the glue code is 00, (ww0,ww1,ww2):=(w0,w2,w1);
      if the glue code is 10, (ww0,ww1,ww2):=(w2,w1,w0);
      if the glue code is 01, (ww0, ww1, ww2):=(w1,w0,w2);
      update the boundary of the mesh;
      equate pairs of references (v0,ww0), (v1,ww1) and (v2,ww2);
end;

In the preferred embodiment described herein, after all the gluing operations are done, we start folding. Recall that folding along an edge is allowed if and only if that edge is the fold edge of both adjacent external triangles. To avoid scanning edges in search of admissible fold ones, the following strategy preferably is adopted. After any folding operation, we recursively attempt to fold along the two external edges of the internal triangle resulting from the folding. In order to do all the folding operations, we call this recursive procedure for all external edges of the mesh.

It can be shown (see A Szymczak and J. Rossignac, *Compression of Tetrahedral Meshes*, GVU Technical Report GIT-GVU-98) that, at this point, all glue and fold boundary faces have disappeared from the boundary of the mesh, i.e., have been identified with other faces becoming internal triangles. In other words, all exterior triangles of the current mesh are in fact boundary.

In this section, we argue that the compression and decompression algorithms can be implemented so that they both run in O(s) time, where s is the encoding size (note that s=O(mlogm) and s=Ω(m)).

In regard to compression, building a tetrahedron spanning tree requires linear time in the number of tetrahedra, since the dual graph of the mesh has m vertices and O(m) edges. In order to create a folding scheme, we remove cut triangles, one at a time, always removing one with a free edge whenever possible. To implement this process so that it runs in O(m) time, one can use a procedure which removes a specified triangle and calls itself recursively for triangles adjacent to those of its edges which become free as a result of that removal. This recursive procedure is first called for all cut triangles with a free edge. After this is done, there are no cut triangles with a free edge left. To get rid of all cut triangles, we simply keep calling the above procedure for an arbitrarily chosen remaining cut triangle (which is then removed and tagged as a g-triangle). Equipping each triangle with an active flag which is reset when the triangle is deleted and storing a count of adjacent active cut triangles for each edge enables to delete cut triangles and test whether an edge is free or not in constant time since there are O(m) triangles, the folding scheme can be constructed in O(m) time. Assuming that it takes unit time to write a bit into a string, the process of creating the folding string takes O(s) time.

In regard to decompression, it takes linear time to build a tetrahedron tree and the data structure representing the mesh boundary (constant time update is necessary for each attaching operation). Reading and interpreting of the folding string takes O(s) time. Each gluing and folding operation can be done in constant time and there are O(m) of them. Thus, folding and gluing takes linear time in m. Similarly, vertex mapping takes O(m) time since it boils down to computing connected components of a graph with O(m) vertices and edges.

It should be noted that one can encode the glue codes in a more compact way. Instead of using 2 bits to represent one of the three possible glue codes, it is possible to use only $[\log_2 3^{(g/2)}]=[(g\log_2 3)/2]$ bits to encode all of them using entropy coding. If the number glue triangles is large, this leads to savings of over 0.4 bits per glue triangle pair.

Perhaps a more promising idea is to look for improvements of the coding scheme for tetrahedron trees. A simple observation that there are exactly m−1 bits set to one in our encoding of a tetrahedron tree leads to the conclusion that our encoding of tetrahedron trees is not optimal. Since ones appear in the tetrahedron tree string about twice as often as zeros, entropy coding techniques allow to encode the tree with $3\log_2 3-2 \approx 2.75$ bits per tetrahedron. One may hope for even better results here, since not all sequences with exactly m−1 non-zero entries are invalid encodings of tetrahedron trees (any encoding string must have the property that there are at least k entries equal to one among the initial 3k symbols for any k<m).

Figure 14:
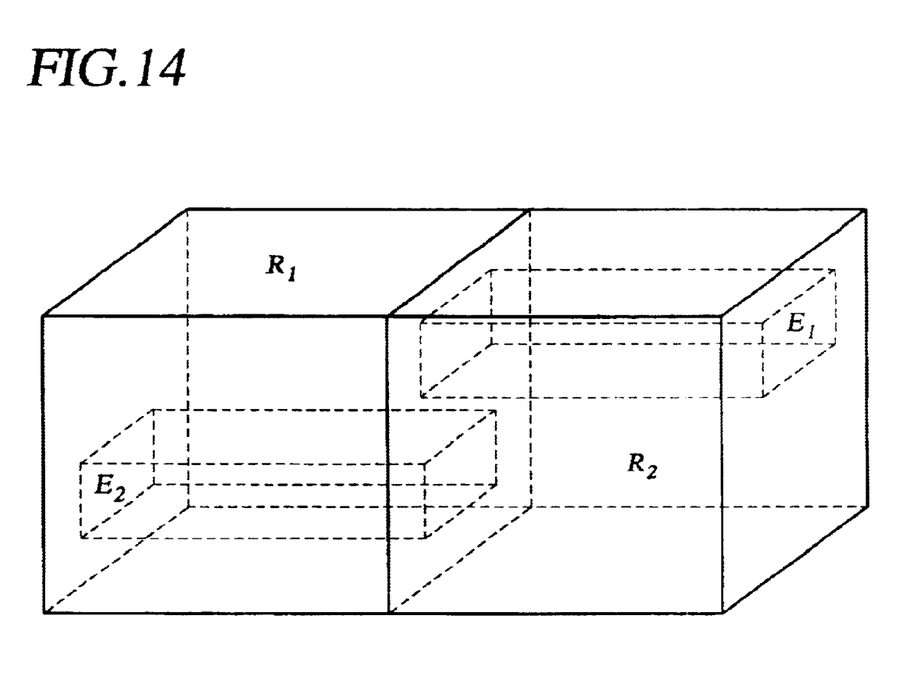
FIG. 14 is a schematic diagram of "a house with two rooms" which represents a two-dimensional simplicial complex which does not cut the 3D-space but whose triangulation has no triangle with a free edge.

Another interesting question concerns the number of glue triangles which are the reason for the non-linear term in our estimate of the encoding length. Glue triangles are certainly needed for meshes with handles. Moreover, the number of glue triangles cannot be smaller than the number of handles. This is because each handle gives rise to a shell of cut triangles with boundary contained in the boundary of the mesh. No matter what the removal order of cut triangles during compression is, each such shell has to be broken at some point by removing a cut triangle with no free edges. However, even for meshes with no holes or handles, glue triangles may be necessary. One can imagine a triangulation of the three-dimensional ball and its tetrahedron spanning tree for which the cut triangles form a superset of the "house" depicted in FIG. 14. Such a house, a two-dimensional simplicial complex which does not cut the 3-space but whose triangulation has no triangle with a free edge, defines two "rooms", $R_1$ and $R_2$. In order to enter RI, one has to walk through the corridor through the other room, starting with the "door" $E_1$. The house consists of the walls of the two rooms with the corridor entrances and exits removed, the corridors boundaries and the two rectangular walls connecting each of the corridors to the outer wall. If this is the case, at least one glue triangle is needed (because the first triangle removed from the house must not have a free edge). However, it may be possible to change the tetrahedron tree so that no house with two rooms appears in the cut complex. For example, one could "close" the entrance $E_1$ in FIG. 14 and, simultaneously, remove some triangle from the wall of $R_1$. The resulting space has the property that triangles can be removed from it one at a time in such a way that each removed triangle has a free edge. We see it as an indication that by changing the cut (or equivalently, tetrahedron spanning tree), it is possible to increase the number of glue triangles and, therefore, improve the performance of the encoding algorithm described herein.

Experimental Results

We tested the embodiment described herein by running its prototype implementation for Delaunay tetrahedralizations of random sets of points in a cube. The tetrahedralizations were generated using the program qhull from the Geometry Center of the University of Minnesota. The results are given in Table 1 hereinafter. In particular, they show that it is quite easy to obtain meshes which require non-zero number of g-triangles. However, the number of such triangles is relatively small, so that the encodings of the glue triangle pairs usually do not contribute to more than 1–2% of the total encoding size.

TABLE 1

| n | m | l | $l_g/l$ | l/m | $T_c$ | $T_d$ |
|---|---|---|---|---|---|---|
| 100 | 514 | 3628 | 0.8% | 7.058 | 0.09 | 0.04 |
| 1K | 6298 | 44430 | 0.8% | 7.055 | 1.19 | 0.52 |
| 10K | 66487 | 469657 | 0.9% | 7.064 | 14.99 | 6.27 |
| 50K | 335188 | 2373774 | 1.2% | 7.082 | 80.43 | 31.93 |
| 100K | 672212 | 4767534 | 1.3% | 7.092 | 166.84 | 70.84 |

An explanation of symbols used in Table 1 is as follows:

l—the total length of the encoding string;

$l_g$—length of the encoding of the glue triangle pairs;

n—number of points;

m—number of tetrahedra;

$T_c$—running time of the compression algorithm (in seconds), and;

$T_d$—running time of the decompression algorithm (in seconds).

The running times are the real time measurements. We ran our implementation on an SGI Power Challenger, with no significant effort to optimize or parallelize the code. One can notice that the running time growth is close to linear in the number of vertices of the mesh and that, for our test cases, the compression ratio never exceeded 7.1 bits per tetrahedron.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention.

What is claimed is:

1. A method for encoding data corresponding to connectivity information of a 3D finite element mesh, the mesh being formed of tetrahedra, said method comprising the steps of:

providing compressed connectivity and vertex data corresponding to connectivity information of the 3D finite element mesh; and reconfiguring the data, including the steps of:

constructing a tetrahedral mesh by attaching new tetrahedra to previously reconstructed tetrahedra;

identifying pairs of faces to be attached, the pairs of faces to be attached being arranged on a boundary of the previously reconstructed tetrahedral mesh prior to attachment;

attaching the pairs of faces to be attached;

labeling vertices of a resulting connectivity graph with labels; and decoding the vertex data in an order that allows unambiguous correlation of decoded vertices with reconstructed mesh vertices by use of the labels.

2. A method for reconfiguring data corresponding to connectivity information of a 3D finite element mesh, the mesh being formed of tetrahedra, said method comprising the steps of:

receiving data corresponding to connectivity information of the 3P finite element mesh, the connectivity information including an order of vertices of the tetrahedra;

selecting a first face of a first tetrahedron of the 3D finite element mesh;

systematically traversing the tetrahedra beginning with the first tetrahedron; and encoding connectivity information of the 3D finite element mesh based upon a reordering of the vertices to define an encoded mesh.

3. The method of claim 2, wherein he step of encoding comprises re-ordering the vertices in an order in which the vertices are utilized when the tetrahedra are systematically traversed.

4. The method of claim 2, wherein the step of encoding comprises the steps of:

defining a tetrahedron spanning tree defining how each tetrahedron is to be attached;

encoding information for identifying pairs of coincident faces that bound a resulting union of tetrahedra; and encoding vertices in a predetermined order based upon vertex labels.

5. A computer readable medium having a computer program stored thereon and being executable by a computer to perform method steps for reconfiguring encoded data corresponding to connectivity information of a 3D finite element mesh, the mesh being formed of tetrahedra, the connectivity information defining an ordering of vertices corresponding to a traversal order of the tetrahedra performed during an encoding process, said method steps comprising:

receiving the encoded data corresponding to the connectivity information of the 3D finite element mesh;

reconstructing the 3D finite element mesh based upon the encoded data;

constructing a tetrahedral mesh by attaching new tetrahedra to previously reconstructed tetrahedra;

identifying pairs of faces to be attached, the pairs of faces to be attached being arranged on a boundary of the tetrahedral mesh prior to attachment;

attaching the pairs of faces to be attached;

labeling vertices of a resulting connectivity graph with labels; and decoding the vertex data in an order that allows unambiguous correlation of decoded vertices with reconstructed mesh vertices by use of the labels.

6. A method for encoding data corresponding to connectivity information of a 3D finite element mesh, the mesh being formed of tetrahedra, said method comprising the steps of:

providing data corresponding to connectivity information of the 3D finite element mesh; and reconfiguring the data based upon identification of faces of each of the tetrahedra where other tetrahedra are to be attached;

reconfiguring the data based upon identification of pairs of faces of the tetrahedra which are to be coincident;

identifying an edge of each of the faces that bound the previously reconstructed tetrahedral mesh and which are to be attached to each other; and imposing a folding order upon those tetrahedra based upon the edges identified.

* * * * *

UNITED STATES PATENT AND TRADEMARK OFFICE
CERTIFICATE OF CORRECTION

PATENT NO.    : 6,718,290 B1
DATED         : April 6, 2004
INVENTOR(S)   : Szymczak et al.

It is certified that error appears in the above-identified patent and that said Letters Patent is hereby corrected as shown below:

Column 3,
Line 56, after the word "than" delete the equation "than $2^{8.2|V|+ O(\log)2|V|}$", and substitute therefor -- $2^{8.2|V|+ O(\log_2 |V|)}$ --.

Column 5,
Line 9, after the word "and", delete the word "a".

Column 8,
Line 5, after the word "thereof", insert -- . --.

Column 9,
Line 34, after the word "alternative", delete ".".

Column 10,
Lines 11-15, after the word "instance.", delete the sentence "The door to the tetrahedron shown in FIGS. 9A and 9B is the back face.", and insert -- For example, the door to the centrally located tetrahedron shown in FIG. 9A is the back face, more specifically, the triangle face with the vertices (0, 1, 2). --

Column 15,
Line 44, after the word "enter", delete the word "RI" and insert -- $R_1$ --.

Column 17,
Line 6, after the words "of the", delete the word "3P", and substitute therefor -- 3D --.

Signed and Sealed this

Sixth Day of July, 2004

JON W. DUDAS
*Acting Director of the United States Patent and Trademark Office*